United States Patent
Eminovic et al.

(10) Patent No.: US 8,813,062 B1
(45) Date of Patent: Aug. 19, 2014

(54) DYNAMICALLY BINDING A LOGIC COMPONENT TO A PROCESSING POINT IN A SOFTWARE EXECUTION FLOW

(75) Inventors: Lejla Eminovic, Nepean (CA); Bryn Rahm, Kanata (CA); Elaine EE Lay Quah, Ingleburn (AU); Anthony Robert Jones, Kanata (CA)

(73) Assignee: Genband US LLC, Plano, TX (US)

( * ) Notice: Subject to any disclaimer, the term of this patent is extended or adjusted under 35 U.S.C. 154(b) by 1041 days.

(21) Appl. No.: 12/316,550

(22) Filed: Dec. 12, 2008

Related U.S. Application Data (60) Provisional application No. 61/013,144, filed on Dec. 12, 2007.

(51) Int. Cl.
G06F 9/44 (2006.01)
G06F 9/445 (2006.01)
H04L 12/24 (2006.01)

(52) U.S. Cl.
CPC .. G06F 8/71 (2013.01); G06F 8/61 (2013.01); G06F 8/65 (2013.01); H04L 41/082 (2013.01)
USPC ........... 717/170; 717/168; 717/172; 717/174; 717/177

(58) Field of Classification Search
CPC ............. G06F 8/60–8/78; H04L 12/56–12/58; H04L 41/082
USPC .......................... 717/101–178; 709/201–253; 719/311–332; 707/600–705
See application file for complete search history.

(56) References Cited

U.S. PATENT DOCUMENTS

| | | | |
|---|---|---|---|
| 5,732,275 A * | 3/1998 | Kullick et al. | 717/170 |
| 6,111,893 A * | 8/2000 | Volftsun et al. | 370/466 |
| 6,226,788 B1 * | 5/2001 | Schoening et al. | 717/107 |
| 6,275,694 B1 * | 8/2001 | Yoshida et al. | 455/419 |
| 6,505,228 B1 * | 1/2003 | Schoening et al. | 718/106 |
| 6,615,166 B1 * | 9/2003 | Guheen et al. | 703/27 |
| 6,851,115 B1 * | 2/2005 | Cheyer et al. | 719/317 |
| 7,076,784 B1 * | 7/2006 | Russell et al. | 719/315 |
| 7,178,143 B2 * | 2/2007 | Pugh et al. | 717/170 |
| 7,181,731 B2 * | 2/2007 | Pace et al. | 717/136 |
| 7,237,222 B1 * | 6/2007 | Nedbal et al. | 717/100 |
| 7,257,413 B2 * | 8/2007 | Sheynblat | 455/456.1 |
| 7,506,336 B1 * | 3/2009 | Ninan | 717/175 |
| 7,555,497 B2 * | 6/2009 | Thompson et al. | 1/1 |
| 7,609,700 B1 * | 10/2009 | Ying et al. | 370/395.21 |
| 7,657,899 B2 * | 2/2010 | Werner | 719/330 |
| 7,712,085 B2 * | 5/2010 | McCollum et al. | 717/130 |
| 7,870,492 B2 * | 1/2011 | Mukundan et al. | 715/749 |

(Continued)

OTHER PUBLICATIONS

On-the-fly program modification: systems for dynamic updating—Mark E. Segal—Bellcore—OPHIR FRIEOER—George Mason University—1993.*

(Continued)

*Primary Examiner* — Lewis A Bullock, Jr.
*Assistant Examiner* — Francisco Aponte
(74) *Attorney, Agent, or Firm* — Jenkins, Wilson, Taylor & Hunt, P.A.

(57) ABSTRACT

A method for use in a communications node includes exposing at least one processing point in an execution flow of base software executing in the communications node. A logic component can be dynamically bound to the exposed processing point, where the logic component specifies actions to be performed by the communications node.

20 Claims, 3 Drawing Sheets

(56) References Cited

U.S. PATENT DOCUMENTS

| | | | |
|---|---|---|---|
| 7,870,564 B2 * | 1/2011 | Copeland et al. | 719/316 |
| 7,945,897 B1 * | 5/2011 | Cook | 717/121 |
| 8,060,553 B2 * | 11/2011 | Mamou et al. | 709/203 |
| 2003/0051236 A1 * | 3/2003 | Pace et al. | 717/177 |
| 2004/0098728 A1 * | 5/2004 | Husain et al. | 719/313 |
| 2004/0139308 A1 * | 7/2004 | Foster et al. | 713/1 |
| 2004/0253956 A1 * | 12/2004 | Collins | 455/445 |
| 2005/0028143 A1 * | 2/2005 | Aridor et al. | 717/122 |
| 2005/0036443 A1 * | 2/2005 | Collins | 370/216 |
| 2005/0144321 A1 * | 6/2005 | Forsberg | 709/245 |
| 2006/0026585 A1 * | 2/2006 | Haselden et al. | 717/168 |
| 2006/0274725 A1 * | 12/2006 | Freitag et al. | 370/352 |
| 2007/0016869 A1 * | 1/2007 | Mukundan et al. | 715/744 |
| 2007/0038770 A1 * | 2/2007 | Zhang | 709/230 |
| 2007/0129817 A1 * | 6/2007 | Cadiz et al. | 700/17 |
| 2007/0192453 A1 * | 8/2007 | Copeland et al. | 709/223 |
| 2007/0253412 A1 * | 11/2007 | Batteram et al. | 370/389 |
| 2008/0104237 A1 * | 5/2008 | Gilfix et al. | 709/225 |
| 2008/0270153 A1 * | 10/2008 | Drapkin et al. | 705/1 |
| 2008/0307392 A1 * | 12/2008 | Racca et al. | 717/120 |
| 2009/0024672 A1 * | 1/2009 | Martin et al. | 707/201 |
| 2009/0049163 A1 * | 2/2009 | Love | 709/223 |
| 2009/0106768 A1 * | 4/2009 | Ramanathan et al. | 719/311 |

OTHER PUBLICATIONS

Rosenburg et al., "SIP: Session Initiation Protocol," Network Working Group, RFC 3261 (Jun. 2002).

"Third Generation Partnership Project; Technical Specification Group Core Network and Terminals; Interworking Between the IP Multimedia (IM) Core Network (CN) Subsystem and Circuit Switched (CS) Networks (Release 6)" 3GPP TS 29.16.3 v. 6.2.0, pp. 1-28 (Jun. 2005).

* cited by examiner

| | Strategy used at Particular Processing Point | | | |
|---|---|---|---|---|
| Entity/Processing Point<br>Solution | E-1<br>X | E-1<br>Y | E-2<br>X | E-2<br>Z |
| Sol-A | E-1(X1,Y2) | | E-2(X1,Z1) | |
| Sol-B | E-1(X3,Y1) | | E-2(X1,Z4) | |
| Sol-C | E-1(X1,Y1) | | E-2(X1,Z1) | |

FIG. 3

FIG. 4 ations, etc.) speci-

DYNAMICALLY BINDING A LOGIC COMPONENT TO A PROCESSING POINT IN A SOFTWARE EXECUTION FLOW

CROSS-REFERENCE TO RELATED APPLICATIONS

This application claims the benefit under 35 U.S.C. §119 (e) of U.S. Provisional Application Ser. No. 61/013,144, entitled "Mechanism to Provide Configurable Message Handling and Routing Behavior in Multi-Purpose Network Applications," filed Dec. 12, 2007, which is hereby incorporated by reference.

TECHNICAL FIELD

The invention relates generally to selecting a logic component to dynamically bind to a processing point in an execution flow of software.

BACKGROUND

Many types of communications can be performed over data networks (wireless and/or wireline networks), including electronic mail, web browsing, file downloads, electronic commerce transactions, voice or other forms of real-time, interactive communications, and others. To enable the establishment of communications sessions in a network, various control functions are deployed in the network. Some standards bodies have defined subsystems within communications networks that include such control functions. One such standards body is the Third Generation Partnership Project (3GPP), which has defined an Internet Protocol (IP) multimedia subsystem (IMS) that includes various control functions for provision of IP packet-switched multimedia services, including audio, video, text, chat, or any combination of the foregoing.

Another standards body is the Third Generation Partnership Project 2 (3GPP2), which has defined a multimedia domain (MMD) network to provide various IP multimedia services. In the wireline context, the equivalent of an IP multimedia subsystem is sometimes referred to as a Next Generation Networks (NGN).

In a network environment, such as in any of the networks noted above, there can be various nodes to perform various different tasks. The requirements of the various nodes within such a network environment can be continually changing, such as due to revisions to the relevant standards governing the corresponding type of network or due to updates desired by network service operators. Also, different service operators can also specify different requirements for the network nodes.

Conventionally, network nodes that are provided by an equipment vendor are configured to a specific set of requirements, as specified by current standards and/or by customers (e.g., network service operators). Thus, different versions of a particular network node may have to be developed by the equipment vendor for use with different standards versions and/or for different customers.

Each different version of a network node is associated with a corresponding different release stream, where a "release stream" can include product development (e.g., development of software to be incorporated in the node), product testing, and release to customers. Having to implement different release streams for different versions of a network node can result in increased development, integration, verification, product management, maintenance, and support costs.

SUMMARY

In general, according to an embodiment, a technique or mechanism is provided to enable flexible and configurable behavior of software to be used in a communications node. For example, a method for use in a communications node includes exposing at least one processing point in an execution flow of software executing in the communications node. The method further includes dynamically binding a logic component to the exposed processing point, where the logic component specifies actions to be performed by the communications node.

Other or alternative features will become apparent from the following description, from the drawings, and from the claims.

DETAILED DESCRIPTION

In the following description, numerous details are set forth to provide an understanding of some embodiments. However, it will be understood by those skilled in the art that some embodiments may be practiced without these details and that numerous variations or modifications from the described embodiments may be possible.

In general, according to some embodiments, an execution flow of base software that executes in a communications node of a communications network has one or more exposed processing points. Each exposed processing point of the execution flow can be bound to a logic component, where the logic component that is bound to the processing point can be one of multiple different logic components that perform different respective actions. "Exposing" a processing point of a software refers to providing an interface or other type of entry to allow an external module (external to the software) to link to or otherwise interact with the software. The logic component that is dynamically bound to the exposed processing point of the base software execution flow can be based on one or more criteria associated with the communications node. The one or more criteria can include product version (e.g., product of customer X, product that supports standard version Y, etc.). For example, a first logic component is bound to the exposed processing point for a first version of the communications node; while a second, different logic component is bound to the exposed processing point for a second version of the communications node. The different logic components perform different tasks according to different requirements (e.g., different requirements associated with different versions of standards, different customer specifications, different deployments of the same customer, different traffic preferences, different end-to-end solution requirements, etc.) specified for different product versions. Dynamically binding a logic component to the base software refers to the ability to selectively bind one of several possible logic components to the base software based on one or more criteria.

The one or more criteria that specify which logic component is to be bound to an exposed processing point of the base software execution flow can also be run-time criteria, such as time-of-day criteria, node loading criteria, etc. For example, during business hours, a first logic component can be bound to the exposed processing point, while a second, different logic component can be bound to the exposed processing point after business hours. As another example, a first logic component can be bound to the exposed processing point if the node is experiencing heavy loading, while a second logic component can be bound to the exposed processing point if the node has light loading.

The logic component that can be bound to an exposed processing point of an execution flow can be in the form of a handler, which is a software routine. The logic component can also be referred to as a "strategy," which is an object that encapsulates a predefined set of logic that is executed at a specific processing point in the execution flow of the base software. The strategies that can be bound to any specific processing point of the execution flow of the base software can be varied based on different requirements of the corresponding communications nodes in which the strategies are to be implemented.

More generally, mutable strategies can be bound to any exposed processing point of a base software execution flow depending upon different requirements defined for communications nodes. In this manner, a common base software can be provided in each of different communications nodes associated with different requirements. Different strategies can then be selected for deployment in the different communications nodes based on the corresponding requirements.

Developing different strategies for different communications nodes is more cost efficient than having to redevelop the base software for the different communications nodes to satisfy different requirements. The base software can be developed just once by an equipment vendor, where development of the base software includes writing the base software, testing the base software, and releasing the base software. Then, based on different requirements received by the equipment vendor for different versions of the communications node, the equipment vendor can develop different strategies accordingly. To deploy a particular version of the communications node in a network, the appropriate one or more strategies can be loaded for binding with exposed processing points of the base software in the communications node.

Instead of the equipment vendor developing different strategies to bind to exposed processing points of a base software execution flow, the customer (such as a service operator) can develop a customized strategy to bind to the base software execution flow, such that the customer does not have to rely on the equipment vendor for the customized strategy (if the vendor has disclosed detailed specifications regarding the base software and binding of strategies to the customer). A service operator can thus extend the life of currently deployed products while providing new services. Also, as standards change, different strategies can be developed to incrementally evolve a network.

The ability to bind different strategies to a particular processing point of the execution flow of a base software allows the behavior of the base software to be changed without touching the source code of the base software. This enables much greater flexibility in implementing different versions of a particular product that is based on the base software. Note also that processing points can be exposed in other software routines other than base software, such as by exposing processing points in logic components corresponding to strategies, as discussed further below.

Figure 1:
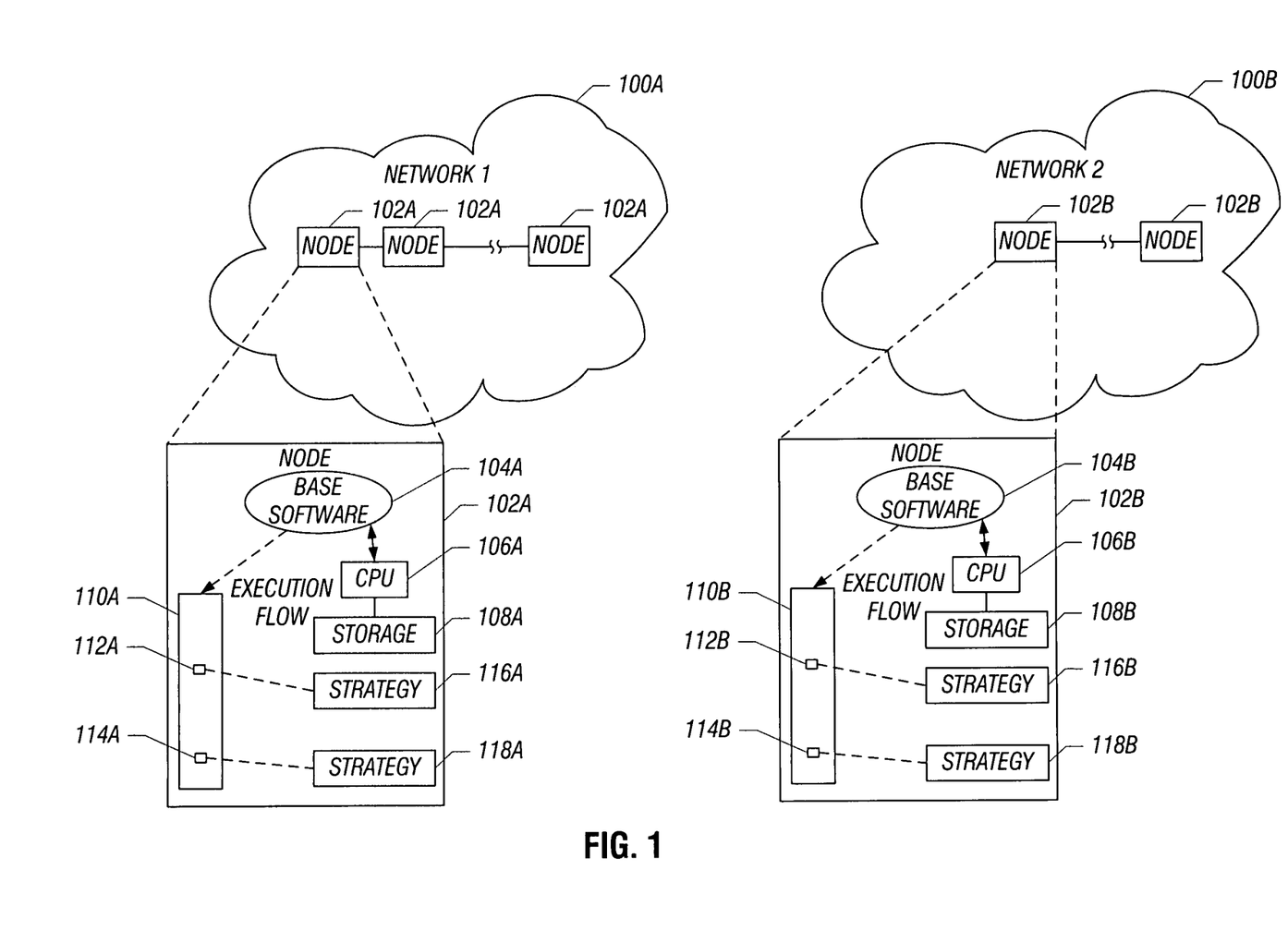
FIG. 1 illustrates exemplary communications networks that include various communications nodes, in which some embodiments of the invention can be incorporated.

FIG. 1 illustrates exemplary communications networks 100A and 100B. The communications network 100A has a number of communications nodes 102A. In one example, the communications network 100A can be an Internet Protocol (IP) multimedia subsystem (IMS) network, as defined by the Third Generation Partnership Project (3GPP). An IMS network includes various control functions, in the form of the nodes 102A, for provision of IP packet-switched multimedia services, including audio, video, text, chat, or any combination of the foregoing.

In alternative implementations, the communications network 100A that provides packet-switched services can be a multimedia domain (MMD) network, as defined by 3GPP2. As yet another alternative, the network 100A can be a Next Generation Network (NGN) used in a wireline context.

Alternatively, the communications network 100A can be a wireless access network, such as a GSM (Global System for Mobile communications) or UMTS (Universal Mobile Telecommunications System) network, as defined by 3GPP; a CDMA 2000 (Code Division Multiple Access 2000) network, as defined by 3GPP2; an LTE (Long Term Evolution) network, as defined by 3GPP; a WiMax (Worldwide Interoperability for Microwave Access) network; or other types of networks.

In the IMS network example, the nodes 102A can be one of several different types of call session control function (CSCF) nodes, such as a proxy CSCF (P-CSCF) node, an interrogating CSCF (I-CSCF) node, or a serving CSCF (S-CSCF) node. The P-CSCF is a SIP (Session Initiation Protocol) aware control contact point for a network entity desiring to access an IMS network. The P-CSCF in turn communicates SIP signaling with an interrogating CSCF (I-CSCF) or serving CSCF (S-CSCF) in the IMS network. An I-CSCF is the contact point within a service operator's network for connections destined to destinations in the service operator's network. Example tasks performed by the I-CSCF include handling initial registration by interrogating an home subscriber server (HSS), routing of a call control message received from another network towards an S-CSCF, and other tasks. An S-CSCF handles session control within the IMS network on behalf of other network entities.

SIP defines control messages that are exchanged to establish multimedia communications sessions in a network. SIP is defined by Request for Comments (RFC) 3261, entitled "SIP: Session Initiation Protocol," dated June 2002.

Another type of node is an Interconnect Border Control Function (IBCF) node, which is a gateway to an external network. In other types of networks, nodes for performing other tasks are contemplated.

As further depicted in FIG. 1, a communications node 102A includes base software 104A, where the base software 104A provides a common set of functions that are common for different versions of a product. The term "product" refers to an assembly of modules that include the base software 104A as well as one or more other software modules that work in combination with the base software 104A to provide a target set of functions. Different versions of the product can correspond to different customers of the equipment vendor that provides the product, or to different deployments of the product for the same customer. Also, different versions of the product may be provided to support different versions of a standard that governs operation of the product, or to different traffic preferences, or to different end-to-end solutions. Note that the term "product" can refer to just the software modules that are to be executed in the communications node 102A, or alternatively, the "product" can refer to the entire node 102A. In one example, the base software can be a generic message processor and router can be used across multiple versions of a product.

The base software 104A is executable on one or more central processing units (CPUs) 106A in the communications node 102A. The one or more CPUs 106A are connected to a storage 108. When executed, the base software 104A provides an execution flow 110A that corresponds to the tasks associated with the base software 104A. The execution flow 110A of the base software 104A can be viewed as a flow of different tasks that are performed based on one or more input stimuli (e.g., in the form of input parameters) received by the base software 104A.

In accordance with some embodiments, the execution flow 110A of the base software 104A has exposed processing points 112A and 114A, which can be bound to respective strategies. In the example of FIG. 1, a strategy 116A is bound to the processing point 112A, and another strategy 118A is bound to the processing point 114A.

In the example of FIG. 1, the network 100A can be considered a first network that is managed by a first service operator. FIG. 1 also shows the second network 100B that can be managed by a second service operator, where the second service operator may specify requirements for communications nodes 102B in the second network 100B that are different from the requirements specified by the first service operator for communications nodes 102A in the first network 100A.

Each communications node 102B contains similar components as communications node 102A, including base software 104B, CPU 106B, and storage 108B. The base software 104B when executed provides an execution flow 110B that has exposed processing points 112B and 114B. The base software 104B is the same as the base software 104A, even though the base software 104B and 104A are provided on different communications nodes 102B and 102A for different service operators.

Since the base software 104A and 104B are the same, the respective exposed processing points 112A, 112B and 114A, 114B in the execution flows 110A and 110B are also the same.

The strategies 116A, 118A and strategies 116B, 118B that are bindable to corresponding exposed processing points in the base software execution flow are considered mutable, since the strategies can be different for different communications nodes that have different requirements. In other words, in the example of FIG. 1, the strategy 116A that is bound to the base software execution flow 110A at exposed processing point 112A is different from (or alternatively can be the same as) the strategy 116B that is bound to the exposed processing point 112B of the base software execution flow 110B. Similarly, the strategy 118A in node 102A is different from (or alternatively can be the same as) the strategy 118B.

In one example, the strategy 116A that is bound to the exposed processing point 112A in the first network node base software execution flow 110A can specify that a specific type of identifier in a control message is to be processed in a first way. However, the strategy 116B that is bound to the corresponding exposed processing point 112B in the second network node base software execution flow 110B can specify that the specific type of identifier in the control message is to be processed in a second, different way.

In a more specific example, the strategy 116A can specify that an E.164 number received in an incoming message is to be resolved by accessing a home subscriber server (HSS). The strategy 116B can specify that telephone number mapping (ENUM) is to be performed. "E.164" refers to a recommendation from ITU-T that specifies the format of telephone numbers.

The strategy that is to be bound to an exposed processing point of an execution flow can be configured at run-time of the node. When a communications node is initialized, configuration information in the communications node can be accessed to identify the strategies that are to be bound to corresponding exposed processing points of the base software execution flow. The identified strategies are then bound to the exposed processing points based on the configuration information. The configuration information can be stored in a storage (e.g., storage 108A or 108B) of the communications node.

In alternative embodiments, instead of (or in addition to) using configuration information pre-stored in the communications node to identify strategies to bind to exposed processing points of a base software execution flow, other (or additional) information can be used instead. Examples of such other information include run-time information (information created during execution of the base software) and external event information (information provided from an external source to the communications node).

Binding a strategy to an exposed processing point of the execution flow 110A or 110B refers to causing a handler that defines the strategy to be loaded such that the handler is able to communicate with the base software 104A or 104B through an interface that corresponds to the exposed processing point. The interface corresponding to the exposed processing point is a well-defined interface, and can include, as examples, shared storage locations in the storage of the node, an application programming interface, and so forth.

Figure 2:
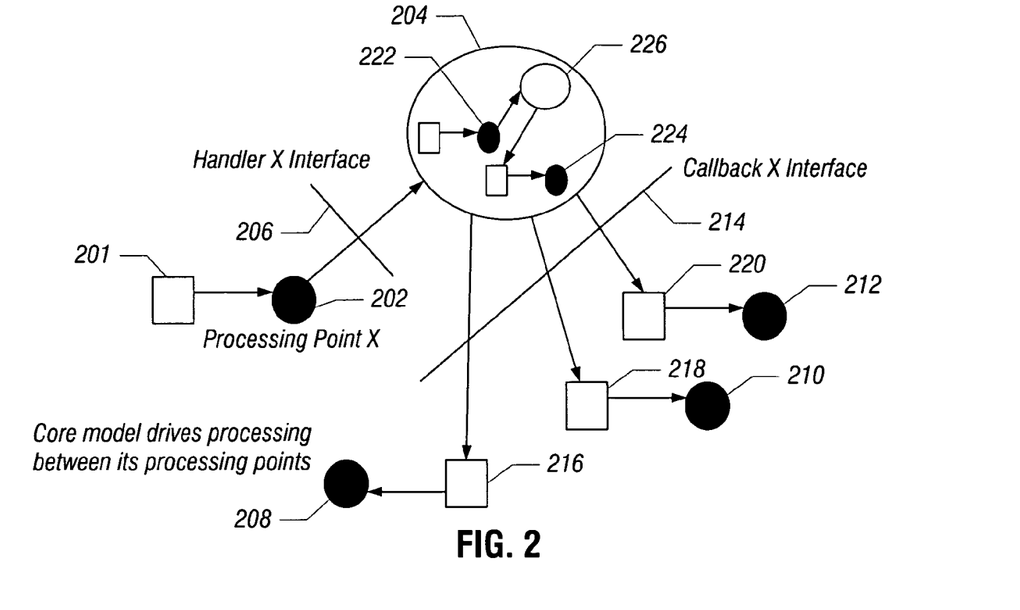
FIG. 2 is a schematic diagram that illustrates exposed processing points in an execution flow of software, and a handler that can be bound to one of the exposed processing points, according to an embodiment.

FIG. 2 illustrates a processing point X (202) of a base software execution flow to which a handler 204 can be bound through a handler X interface 206. FIG. 2 also shows other exposed processing points 208, 210, and 212 that can be bound to other handlers (not shown). The base software is responsible for performing execution between exposed processing points. FIG. 2 also shows rectangular boxes 201, 216, 218, and 220 that represent points in the execution flow of the base software that are able to interact through respective interfaces to external modules.

In addition to being able to bind to the execution flow of the base software through the processing point X (202), the handler 204 is also able to access other portions (216, 218, 220) of the base software through a callback X interface 214. Execution of the handler 204 produces outputs that can be provided back to the base software through the callback X interface 214.

The handler 204 itself can be associated with an execution flow which has its own exposed processing points 222 and 224. A sub-handler 226 can be bound to the exposed processing point 222 in the execution flow of the handler 204. The ability to provide exposed processing points at the handler level allows for greater flexibility, since the behavior of the handler 204 at its exposed processing points can be modified based on binding selected different sub-handlers (that encapsulate different strategies) to those exposed processing points. In the embodiment depicted in FIG. 2, multiple levels of processing points can be exposed, including processing points in the execution flow of base software, and processing points in the execution flow of a handler.

The handler that implements a strategy should fully contain and control all rules that are relevant or applicable at the specific exposed processing point of an execution flow. Decision-making regarding tasks to be performed by the handler is completely delegated to the strategy object represented by the handler that is bound to a specific processing point.

Various benefits can be provided by some embodiments of the invention. Different strategies applied at specified processing points can yield different behaviors of a product for adaptation to different solutions. Combinations of well, tailored strategies can be applied at specific processing points within a particular solution to yield a flexible deployment of the product. A well-defined and simple external mechanism is provided to configure behavior of the product. The same base software can support diverse requirements and can enforce different policies.

Figure 3:
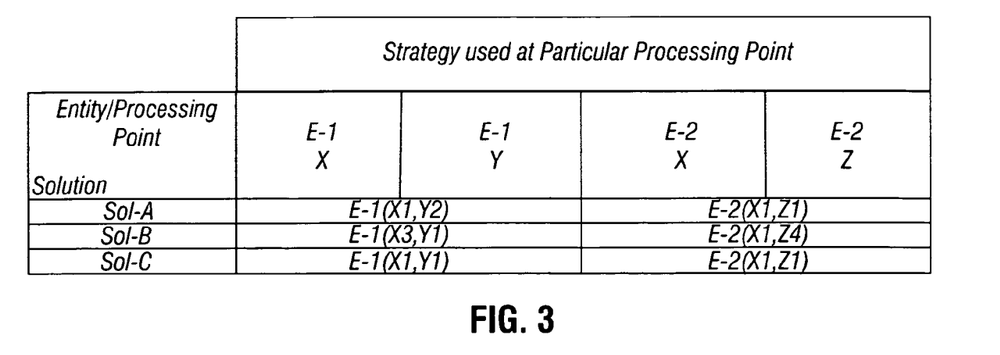
FIG. 3 depicts a table that illustrates different possible solutions for base software, according to an embodiment.

FIG. 3 depicts a table that illustrates different solutions that are possible for two base software applications E-1 and E-2. Each base application E-1 or E-2 is an example of base software. For base application E-1, two processing points X and Y are exposed. X1 and X3 specify possible strategies for processing point X, while Y1 and Y2 are possible strategies for processing point Y. For a first solution (Sol-A), the strategy selected for processing point X of base application E-1 is X1, while the strategy selected for processing point Y of base application E-1 is Y2—this solution (Sol-A) is represented as E-1 (X1, Y2) in FIG. 3. The table in FIG. 3 also shows other solutions (Sol-B and Sol-C) for the base application E-1. The different solutions, Sol-A, Sol-B, and Sol-C, can be deployed in different versions of a particular product supplied by an equipment vendor.

The table of FIG. 3 also shows solutions for the base application E-2. For base application E-2, processing points X and Z are exposed, where strategy X1 is selected for each of solutions Sol-A, Sol-B, and Sol-C at processing point X, and strategy Z1 or Z4 is selected for solutions Sol-A, Sol-B, and Sol-C at processing point Z.

The different solutions for base application E-1 can correspond to different requirements set by different customers and/or set by different standards versions. Similarly, the different solutions for base application E-2 can also correspond to different requirements set by a customer and/or standards version.

In one example, the two base applications E-1 and E-2 collaborate to provide one of the three possible solutions Sol-A, Sol-B, or Sol-C. FIG. 3 shows that the same strategy (e.g., X1) can be re-used by different applications if the applications share the same logical processing point, which in this example is processing point X. One specific example can involve two different applications S-CSCF and I-CSCF that can share the same strategy at some logical processing point.

The following provides some examples of different solutions associated with different requirements. In one example, SIP control messages are exchanged to establish multimedia communications sessions in a network. A SIP control message can include a SIP Uniform Resource Indicator (URI), which identifies a communications resource (e.g., a user, a telephone number, etc.). There can be different URI types. There may be different requirements for handling different URI types. For example, a first URI type is an SIP address of record, while another URI type is a global or local phone number. Different node deployments may desire to handle the different URI types differently. The following provides some examples of how different URI types can be handled.

A first strategy may specify that invalid URI formats are not to be propagated. Another strategy may specify that local phone numbers are to be routed to a public switched telephone network (PSTN). Yet another strategy is that domain ownership is to be disregarded for E.164 numbers represented in SIP notation. Another strategy may specify that handling is to be provided only for domains served or owned by a particular network for E.164 numbers represented in SIP notation.

Another example of different strategies to handle a particular functionality is in the context of ENUM processing. ENUM defines a suite of protocols to unify the telephone numbering system (E.164) with the Internet addressing system. Different strategies can specify whether ENUM services are to be supported, and if so, the specific actions to take for ENUM services. The services can include translation of ENUM numbers, routing messages containing ENUM numbers, and other tasks. Also, strategies can be specified for handling users that belong to a peer IMS network, or a user that does not belong to a network managed by a provider that has a peering agreement.

In a more specific example, a SIP Invite message (which is a setup message used to establish an IP packet-switched session) can include a Tel-URI (one type of URI) that contains an E.164 number. A first strategy can specify that the E.164 number is to be resolved to a SIP URI by using an ENUM technique, such that the call can be routed to a terminating control node within the same network. A second strategy can specify that the E.164 number cannot be resolved using ENUM, and that the call has to be routed to a PSTN to complete the call.

Different ENUM processing strategies or different URI type processing strategies can also be implemented in different IMS network nodes, such as P-CSCF nodes, S-CSCF nodes, and I-CSCF nodes.

Figure 4:
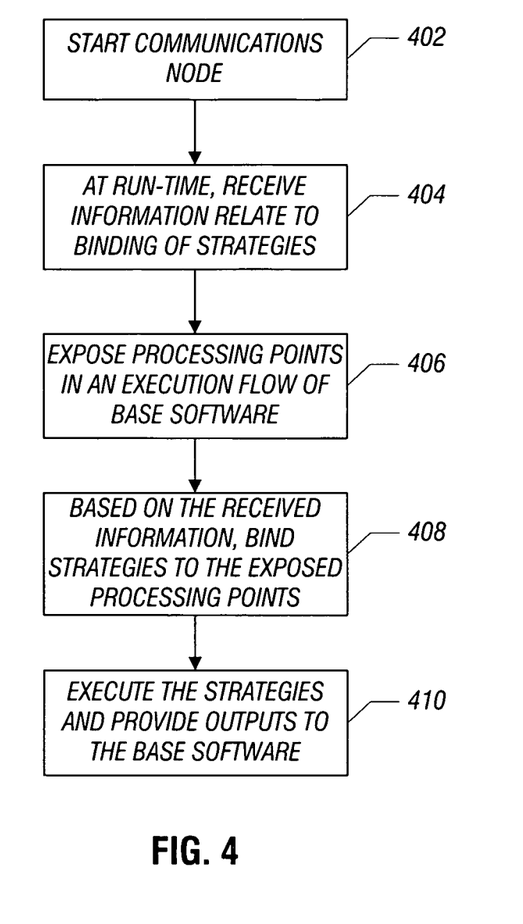
FIG. 4 is a flow diagram of a process according to an embodiment.

FIG. 4 is a flow diagram of a general process according to an embodiment. A communications node is started (at 402), such as at initial deployment in a network. At run-time of the communications node, the communications node receives (at 404) information relating to binding of strategies at exposed processing points of a base software execution flow. The information can be in the form of pre-stored configuration information stored in a non-volatile storage of the communications node. Alternatively, the information can be generated at run time, or can be received from an external source by the communications node.

Processing points of the base software execution flow are exposed (at 406), and based on the received information regarding binding of strategies, the communications node binds (at 408) selected strategies to the exposed processing points. A strategy bound to any particular exposed processing point is one strategy that is selectable from among multiple different strategies that can be bound to the particular exposed processing point. Note that strategies can be bound upfront for all processing points (based on deployment configuration only), or alternatively, one or more specific processing points can be bound to one or more corresponding strategies upon reaching each of the specific processing points based on configuration and/or run-time data. This latter approach has the benefit of being able to change strategy (i.e., behavior) on the fly while the system is running.

The bound strategies are then executed (at 410) and outputs of the executed strategies are provided to the base software.

Note that as the communications node evolves due to evolving requirements, then the strategies that are bound to the exposed processing points of the base software execution flow can be replaced by loading new strategies into the communications nodes and binding such new strategies to the exposed processing points in place of the previous strategies.

Instructions of software described above, such as base software 104A, 104B or handlers 204, can be executed on a processor (e.g., CPU 106A or 106B). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for deploying at least one communications node, comprising:
    exposing a processing point in an execution flow of base software executing in the communications node, wherein the base software provides a set of functions that are common for different versions of the communications node; and
    dynamically binding a first logic component from among multiple different logic components to the exposed processing point, wherein the first logic component that is bound to the exposed processing point, in the form of a handler, specifies actions to be performed by the communications node, and wherein each of the multiple different logic components are bindable to the exposed processing point and include predefined sets of logic distinct from the base software for processing information and providing output to the base software, wherein the base software receives the output via a callback interface and the execution flow of the base software proceeds in response to receiving the output via the callback interface, wherein each of the multiple different logic components are bindable to the exposed processing point for implementing different versions of the communications node; and
    deploying the base software in multiple different versions of the communications node, and wherein execution of the base software in a second version of the communications node results in an execution flow having an exposed processing point bound to a second logic component.

2. The method of claim 1, wherein exposing the processing point comprises exposing an interface, and wherein binding the first logic component comprises binding the handler through the interface to the exposed processing point.

3. The method of claim 2, further comprising executing the handler to perform one of (1) processing of a control message used for performing a communications task by the communications node, and (2) routing of the control message.

4. The method of claim 1, further comprising receiving a different logic component to dynamically bind to the exposed processing point, wherein the different logic component is bound to the exposed processing point in place of the first logic component.

5. The method of claim 1, further comprising:
    exposing a second processing point in the execution flow of the base software; and dynamically binding a second logic component to the second processing point to perform further configurable actions in the communications node.

6. The method of claim 1,
    wherein the second logic component performs different tasks than the first logic component.

7. The method of claim 1, wherein exposing the processing point in multiple execution flows of the base software in different versions of the communications node enables different logic components to be bound to the exposed processing point to configure different behaviors of the different versions of the communications node.

8. The method of claim 1, further comprising:
    providing information at the communications node at run-time of the communications node, wherein dynamically binding the first logic component to the exposed processing point is based on the information.

9. The method of claim 8, wherein providing information at the communications node at run-time comprises accessing pre-stored configuration information at run-time in the communications node.

10. The method of claim 8, wherein providing the information at the communications node at run-time comprises generating the information at run-time in the communications node.

11. The method of claim 8, wherein providing the information at the communications node at run-time comprises receiving the information at run-time from an external source by the communications node.

12. A method to provide flexible deployment of a product related to network communications, comprising:
    providing base software to be executed in plural communications nodes incorporating corresponding plural versions of the product related to network communications, wherein execution of the base software in each of the plural communications nodes produces a corresponding execution flow with at least one exposed processing point, wherein the base software provides a set of functions that are common for the plural communications nodes; and
    providing different information to the plural communications nodes to cause the plural communications nodes to dynamically bind a different strategy or the same strategy to the exposed processing point of the execution flow in each of the plural communications nodes, wherein each binded strategy includes a predefined set of logic in the form of a handler, distinct from the base software of a corresponding communication node for processing information and providing output to the base software of the corresponding communication node, wherein the base software of the corresponding communication node receives the output via a callback interface and the execution flow of the base software of the corresponding communication node proceeds in response to receiving the output via the callback interface, wherein each binded strategy implements a function differently than other binded strategies; and
    deploying the base software in multiple different versions of the communications node, and wherein execution of the base software in a second version of the communications node results in an execution flow having an exposed processing point bound to a second logic component.

13. The method of claim 12, wherein the product related to network communications is a product related to packet-switched communications.

14. The method of claim 12, wherein the product related to network communications is a product related to tasks of an Internet Protocol multimedia system (IMS) network node.

15. The method of claim 12, wherein the product related to network communications is a product related to tasks of a multimedia domain (MMD) network node.

16. The method of claim 12, wherein dynamically binding a different strategy to the exposed processing point of the execution flow in each communications node comprises dynamically binding a different strategy to process a call control message differently.

17. The method of claim 12, wherein dynamically binding a different strategy to the exposed processing point of the execution flow in each communications node comprises dynamically binding a different strategy to route a call control message differently.

18. A communications node comprising:
at least one processor;
base software to perform communications tasks executable on the at least one processor, wherein execution of the base software results in an execution flow having an exposed processing point, wherein the base software provides a set of functions that are common for different versions of the communications node; and
a strategy bound to the exposed processing point of the execution flow, wherein the base software and strategy together are part of a product whose behavior is configurable using the strategy, wherein the strategy is selected from among multiple different strategies that dynamically are bindable to the exposed processing point and include predefined sets of logic in the form of a handler, distinct from the base software for processing information and providing output to the base software, wherein the base software receives the output via a callback interface and the execution flow of the base software proceeds in response to receiving the output via the callback interface, wherein each of the multiple different strategies are bindable to the exposed processing point for implementing different versions of the communications node; and
wherein the base software is deployed in multiple different versions of the communications node, and wherein execution of the base software in a second version of the communications node results in an execution flow having an exposed processing point bound to a second logic component.

19. The communications node of claim 18, wherein binding of the strategy to the exposed processing point is based on information received by the communications node at run-time, wherein modification of the information enables a different strategy to be bound to the exposed processing point to configure a different behavior of the product.

20. The communications node of claim 18, wherein the information received by the communications node comprises one of: (1) pre-stored configuration information accessed by the communications node at run-time; (2) information generated by the communications node at run-time; and (3) information received from an external source at run-time.

* * * * *